(No Model.)
T. A. EDISON.
Magneto or Dynamo Electric Machine.
No. 242,898. Patented June 14, 1881.
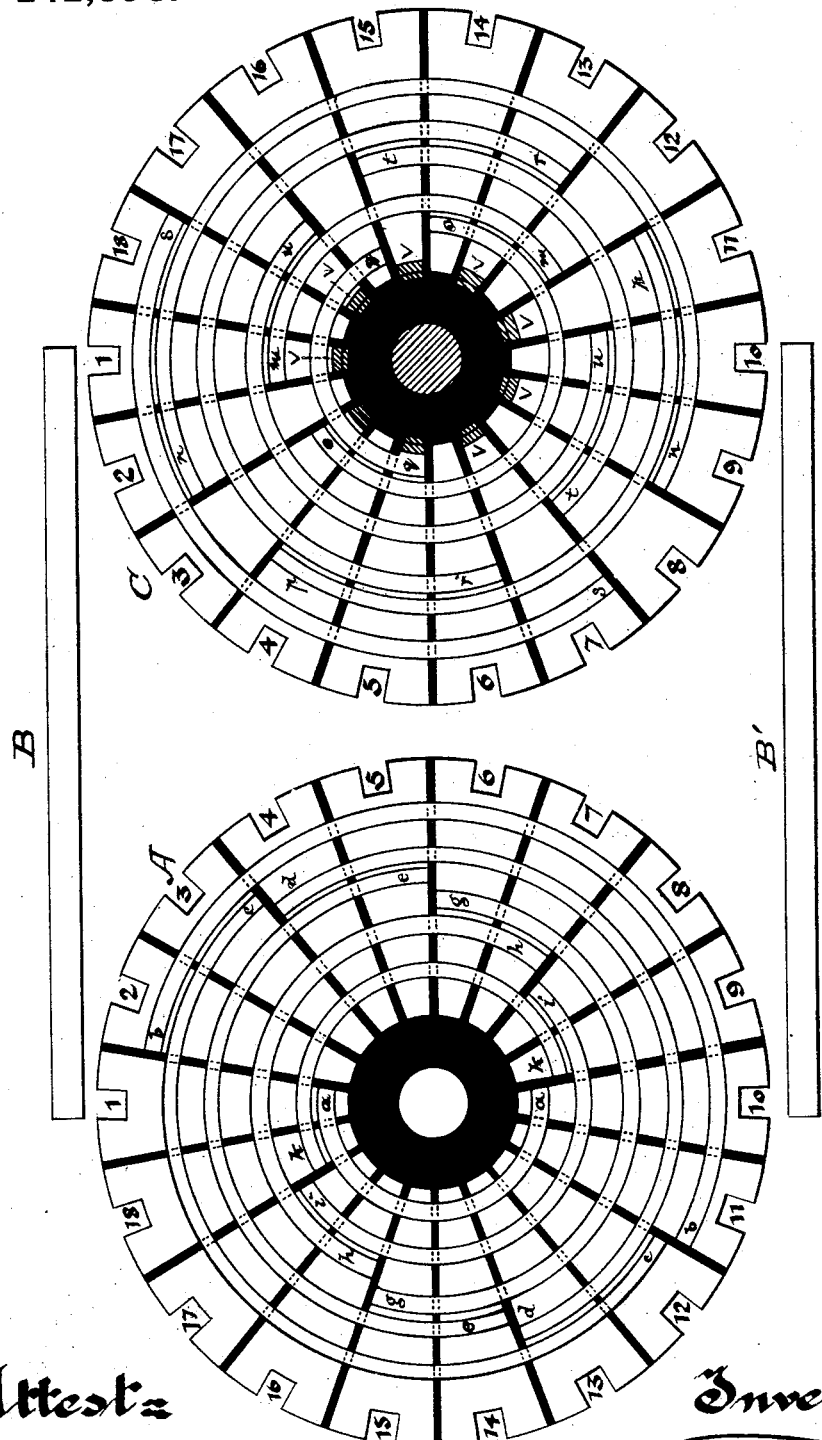

UNITED STATES PATENT OFFICE.

THOMAS A. EDISON, OF MENLO PARK, NEW JERSEY.

MAGNETO OR DYNAMO ELECTRIC MACHINE.

SPECIFICATION forming part of Letters Patent No. 242,898, dated June 14, 1881.

Application filed December 15, 1880. (No model.)

*To all whom it may concern:*

Be it known that I, THOMAS A. EDISON, of Menlo Park, in the county of Middlesex and State of New Jersey, have invented certain new and useful Improvements in Magneto or Dynamo Electric Machines, (Case No. 266;) and I do hereby declare that the following is a full and exact description of the same, reference being had to the accompanying drawing, and to the letters of reference marked thereon.

In that class of magneto or dynamo electric machines in which the revolving armature is composed of a cylindrical core whose surface is partially or entirely covered with coils wound parallel to the axis of the armature the coils cross each other at the ends, so that there is a large mass of wire upon the ends useless for the purposes of generation, while interposing unnecessary internal resistance in the machine, and at the same time being in position for excessive accumulation of heat. These masses of wire, crossing each other at the ends, render repairs to any coil exceedingly difficult, for the repair of any one coil involves the unwinding of such coils as may overlap it upon the ends.

One object of this invention is to construct the revolving armature so that these defects are remedied, to which end this portion of the invention consists in fixing upon insulating-disks which are to be secured to the ends of the armature metal plates or bars corresponding in number to the number of coils or conducting-bars; or if a coil be considered as consisting of the two active wires or assemblages of wires exactly opposite to each other upon the face of the armature, then the number of plates is double that of the coils. These bars are arranged upon the disks as spokes from a hub, radiating from the center, and may be termed the "radiating" plates or bars. These plates or bars are electrically joined in pairs or couples by circular metallic conductors permanently fixed upon the insulating-disks, care being taken to insulate these circular joining conductors from each other. This arrangement of radiating bars or plates and joining conductors takes the place of the wires which formerly crossed the ends. The radiating plates or bars are provided at their outer edges with recesses, in which the active generating metal, whether in the form of wires, strips, ribbons, or bars, may be secured by soldering or by screws, or they may be secured together in any other suitable way.

The construction of revolving armatures as ordinarily practiced, especially in the case of very large machines, requires the use of a large amount of insulated wire. This is expensive, and besides takes up room and allows of the accumulation of heat, owing to the non-conductor forming the insulation, to remedy which is another object of this invention, to which end I use rigid naked bars or wires of proper material, which are so disposed about the armature that each is separated from the others, there being between them an insulation partly of mica and partly of air, which suffices in practice for insulation, and in addition allows such access of air to all the active parts of the armature that danger of heating thereof by accumulation is greatly lessened.

In dynamo or magneto electric machines it is often desirable to give considerable electromotive force to the generated current, while at the same time there is maintained a low degree of internal resistance of the machine.

Another part of the invention relates to the accomplishment of this, and consists in so arranging the coils or bars and the commutators that all the coils or bars are always in circuit, so that an electro-motive force due to the entire length of all the coils is obtained, and at the same time that part of the conductors which does not set up an electro-motive force within the circuit is made of lower resistance by means of the circular and radial bars or plates at the ends than the portion in which the electro-motive force arises.

The entire invention may be carried into effect by means substantially such as shown in the drawing, wherein C is the commutating end and A the other end of an armature.

Upon suitable insulating bases circular in form the radial metal plates numbered 1 to 18 in A and C are secured, insulated from each other, as indicated, by the blank space between them. Upon A the circular plate or bar *a* connects 1 and 10; *b*, 2 and 11; *c*, 3 and 12; *d*, 4 and 13; *e*, 5 and 14; *g*, 6 and 15; *h*, 7 and 16; *i*, 8 and 17; *k*, 9 and 18. Each of these bars is insulated from the other and from all the plates excepting those which it is designed to connect. It will be noticed that upon this end the circular bars connect exactly opposite coils, as would the wires ordinarily used. Upon the commutating end C the arrangement is somewhat different. Upon it 1 and 12 are connected by $m$, 2 and 9 by $n$, 3 and 14 by $o$, 4 and 11 by $p$, 5 and 16 by $q$, 6 and 13 by $r$, 7 and 18 by $s$, 8 and 15 by $t$, 10 and 17 by $u$. These bars are insulated, as before stated in the case of A. Upon the commutating end the odd-numbered circular bars are bent outwardly at a right angle at their inner end, the bent portions $v\ v$ being secured to a hub and forming the commutator. To these end disks thus constructed are secured wires, ribbons, or bars in any suitable manner, forming with the radial and circular plates the coils.

For large machines I prefer to use naked bars of copper, B B', which are secured in the recesses shown in the outer edges of the radial plates. They will be sufficiently insulated from each other by the air-space between them. If bars are used not sufficiently rigid to preserve their relative distances from each other throughout their length, stays or blocks of insulating material—such as mica—may be placed between them at proper intervals.

By the arrangement of connections and the commutator, as shown in C, all the coils are constantly in circuit, the generated current having the electro-motive force of a coil of the total length of all the coils, while the internal resistance is kept low by the lessening of resistance in the ends due to the much larger mass of conductor in section of the plates and bars over that of the wires ordinarily used, while the resistance of the active parts, when bars are used, as described, is also greatly lessened.

Supposing the parts are in such position that the commutator-brushes are in connection with 5 and 15, the path of the generated currents will be as follows: starting, say, at the brush on 5, the path in the machine to 15 would be, for one portion of the current via 5 $e$ 14 $o$ 3 $c$ 12 $m$ 1 $a$ 10 $u$ 17 $i$ 8 $t$ 15, and for the other portion via 5 $q$ 16 $h$ 7 $s$ 18 $k$ 9 $n$ 2 $b$ 11 $p$ 4 $d$ 13 $r$ 6 $g$ 15, thus including every coil.

What I claim is—

1. A revolving armature for magneto or dynamo electric machines having its generative portion composed of coils or bars placed longitudinally upon the core and parallel with its axis of rotation, and having its ends formed of radial plates, one for and connected to each coil or bar, substantially as set forth.

2. The combination, in an armature for magneto and dynamo electric machines, of radial plates and circular connecting-plates, substantially as and for the purpose set forth.

3. An armature for dynamo or magneto electric machines having ends formed of conducting-plates, arranged as described, and with its active or generative portions removably attached to the plates, substantially as set forth.

4. An armature for dynamo or magneto electric machines having its active or generative portions made of naked bars or ribbons of metal, substantially as and for the purpose set forth.

This specification signed and witnessed this 11th day of December, 1880.

THOS. A. EDISON.

Witnesses:
 H. W. SEELY,
 WM. CARMAN.